Feb. 10, 1942.        F. CAVALLO        2,272,509
VARIABLE SPEED FRICTION GEAR POWER TRANSMISSION DEVICE
Filed June 11, 1941        2 Sheets-Sheet 2
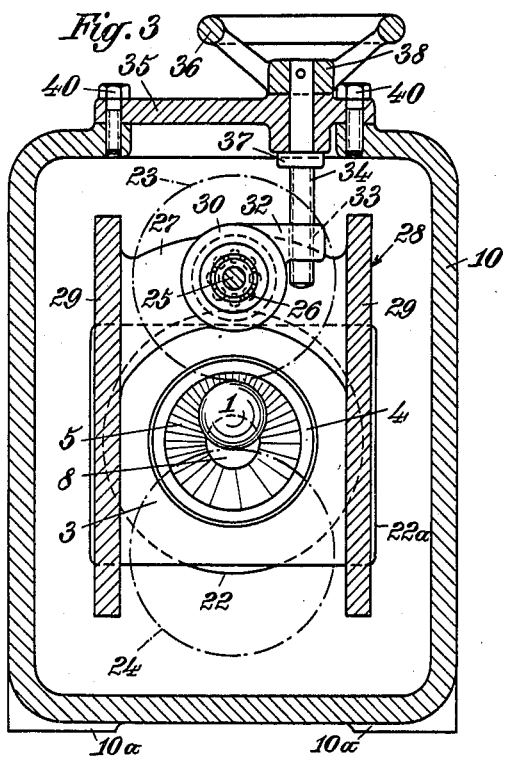
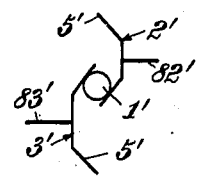
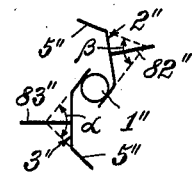
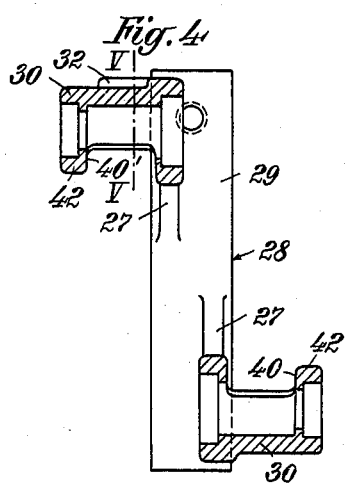
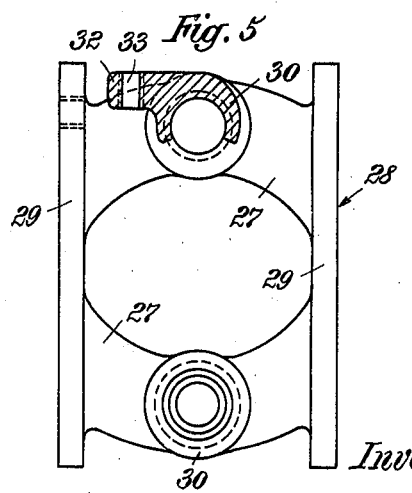
Inventor:
Friedrich Cavallo
BY
Harness, Dickey & Pierce
Attorneys Patented Feb. 10, 1942

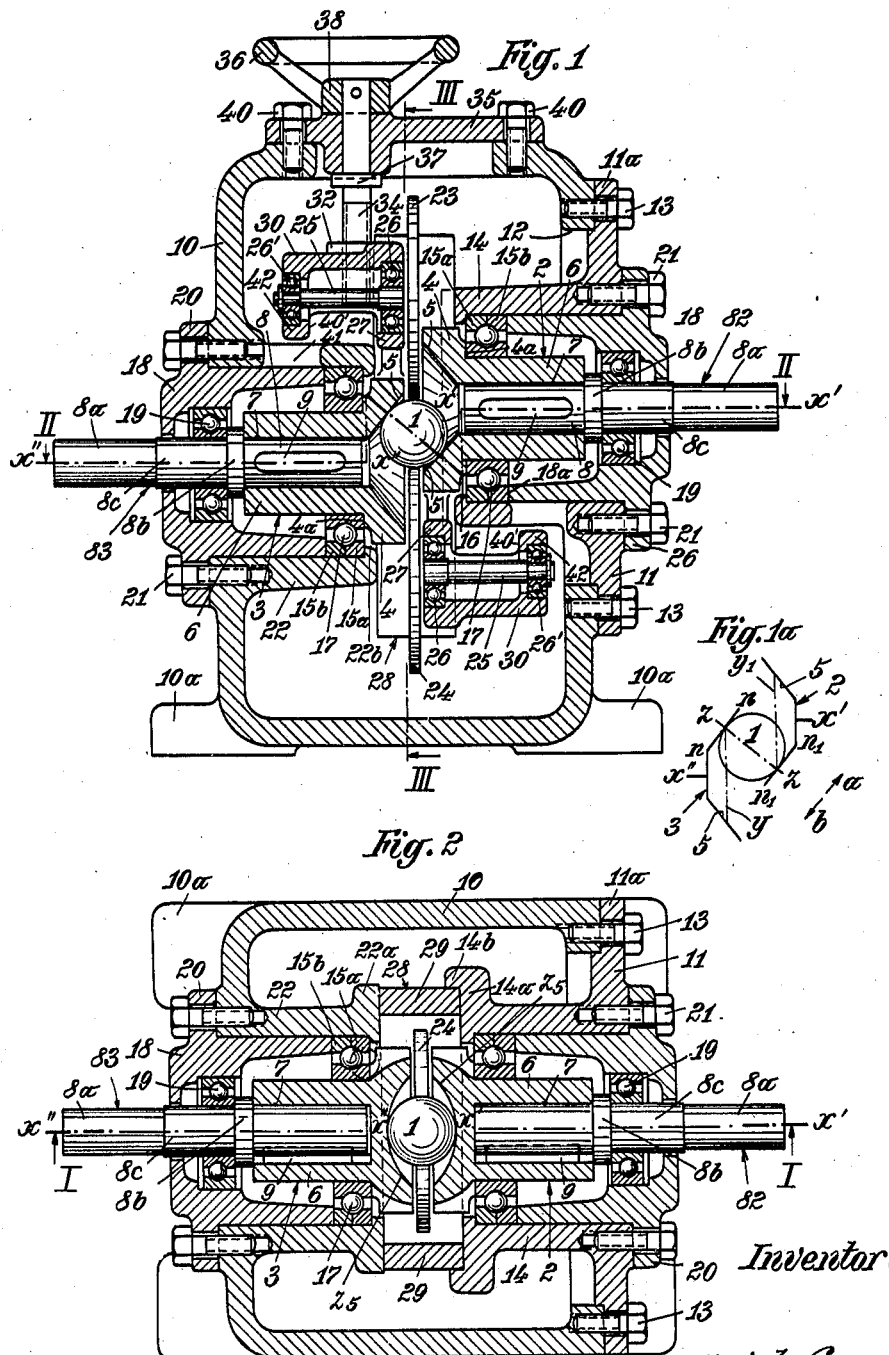

2,272,509

UNITED STATES PATENT OFFICE 2,272,509

VARIABLE SPEED FRICTION GEAR POWER TRANSMISSION DEVICE

Friedrich Cavallo, Berlin, Germany

Application June 11, 1941, Serial No. 397,512

6 Claims. (Cl. 74—193)

This invention relates generally to variable speed friction gear power transmission devices, and has for its especial object to provide an improved friction drive mechanism wherein the compressive force necessary to the transmission of the driving torque from a driving member onto a driven member is being produced by an automatic wedging action between co-operating friction members, such wedging action varying in response to the momentary magnitude of the transmitted torque.

Another object of this invention is to provide an improved variable speed friction gear power transmission mechanism comprising a pair of friction members, viz. a driving member and a driven one having each a dish-shaped frusto-conical surface, and an intermediate friction member formed as a ball inserted between and being in contact with both of said dish-shaped surfaces.

A further object of this invention is to provide an improved variable speed friction gear power transmission mechanism of the type specified having its driving and driven members mounted to rotate about spaced axes lying in a common plane and being substantially parallel to one another, said ball shaped intermediate friction member being in engagement with a pair of mutually parallel generatrices on both of said frusto-conical surfaces. Such intermediate friction member can be displaced along said parallel generatrices providing thus for a variation of the ratio of the transmission mechanism in a manner to be explained with more detail in the following.

With the above and other objects in view, the invention consists of the novel devices and combination of devices hereinafter described and defined in the claims.

The invention is illustrated in the accompanying drawings in which—

Fig. 1 is a view of a power transmission mechanism according to this invention represented in vertical section taken on the line I—I of Fig. 2, Fig. 1a is a diagrammatic representation of the essential operating elements of the power transmission mechanism represented on Figs. 1 to 3, Fig. 2 is a sectional view taken on the line II—II of Fig. 1, Fig. 3 is a side sectional elevation taken on the line III—III of Fig. 1, Fig. 4 is a sectional elevation of a part of the mechanism represented on Figs. 1 to 3 taken on the line I—I of Fig. 2, Fig. 5 is a corresponding side elevation viewed from the left of Fig. 4 and having one of its parts represented in vertical section taken on the line V—V of Fig. 4.

Figs. 6 and 7 are respectively diagrammatic views of two further alternative embodiments of a power transmission mechanism constructed in accordance with this invention.

Like characters indicate like parts through-out the several views.

Referring more particularly to Figs. 1, 1a, 2 and 3 of the drawings, the reference character 1 designates a ball serving as intermediate friction member. The ball 1 is inserted between a pair of identically shaped main friction members or wheels 2 and 3. Each of said friction wheels comprises a disc-like portion 4 having its operating surface 5 formed as a dished frusto-conical surface. Integrally with the disc-like portion 4 is formed a hub 6 having its bore 7 mounted on the end 8 of a shaft. The friction wheels 2 and 3 are mounted to rotate together with their shafts on which they are fixed by keys 9. In the example of embodiment represented in Figs. 1 and 2 the friction wheels 2 and 3 are mounted respectively on a driving shaft 82 and a driven shaft 83. It is evident that the shaft 82 could be the driving one and the shaft 83 the driven one. The remote end 8a of each of said shafts may carry a gear wheel, a belt pulley or any other member not represented, adapted to transmit driving motion to the shaft or respectively to be driven by it.

Both the main friction members or wheels 2 and 3 and the intermediate friction member or ball 1 are enclosed in a housing 10 supported by feet 10a. The housing 10 may be filled up to a certain level with oil or with any other lubricant (its level not being represented).

The shafts 82, 83 of the friction wheels 2 and 3 are mounted in the housing 10 in such a manner that their geometrical axes $x'$—$x'$ and $x''$—$x''$ are parallel and spaced apart from one another. In the contemplated embodiment both axes lie in the plane defined by the sectional line I—I of Fig. 2, whilst their spacing may be seen from Figs. 1 and 1a. Under these circumstances the ball 1 is in contact with the uppermost generatrix $n$—$n$ of the operating surface 5 of the friction wheel 3 and with the lowermost generatrix $n_1$—$n_1$ of the operating surface 5 of the friction wheel 2 (Fig. 1a).

The friction wheel 2 together with its shaft 82 are journalled in a circular lid 11 provided with a flange 11a. Said lid is mounted in a corresponding circular aperture 12 of the housing 10 and it is attached to said housing by a number of bolts 13. The lid 11 has a sleeve-shaped extension 14 provided with an inwardly projecting circular rim 16. Accommodated in the bore of the sleeve extension 14 is a ball bearing 17 having its outer race formed of two parts 15a and 15b. Said ball bearing has sufficiently deep grooves in its races, so that it is capable of transmitting also axial thrusts. For this purpose said ball bearing is mounted between a shoulder 4a of the disc-like portion 4 of the friction wheel 2 and an end surface 18a of a supporting member 18 inserted in the bore of the sleeve 14 and accommodating a further ball bearing 19 carrying a journal 8c of the driving shaft 82. The supporting member 18 has its flange 20 attached to the lid 11 by a number of bolts 21.

The friction wheel 3 is mounted in a similar way as the friction wheel 2, except for its supporting member 18 being inserted directly into a bore of an end wall of the housing 10 having integrally cast therewith a sleeve extension 22 corresponding to the above mentioned sleeve extension 14 and provided with an inwardly projecting annular rim 22b.

Arranged above and respectively below the ball 1 and between the friction wheels 2 and 3 are discs 23, 24 adapted to position said ball 1 in transverse direction between the geometrical axes $x'-x'$ and $x''-x''$ of the shafts 82 and 83 respectively. Each of the discs 23 and 24 is rigidly carried by an axle 25 rotatably mounted by means of ball bearings 26, 26' in a bridge portion 27 of a frame 28 represented with more detail in Figs. 4 and 5 and hereinafter to be described.

The frame 28 comprises two vertical side members 29 interconnected by a pair of bridges 27 as represented more clearly in Figs. 4 and 5. Integrally connected with said bridges are brackets 30 adapted to accommodate in their remote ends the ball bearings 26' (Fig. 1). The ball bearings 26 are mounted in the web of the bridges 27. The frame 28 is mounted to slide in vertical direction in contact with correspondingly enlarged side extensions 22a, 14a of the sleeves 22 and 14 respectively. As may be seen from Fig. 2, the side extensions 14a have projecting lips 14b adapted to straddle and laterally to guide the vertical side member 29 of the frame 28.

The upper bracket 30 of the frame 28 has integrally cast therewith an eye 32 to be seen from Figs. 1, 3 and 5, said eye being provided with a threaded opening 33. An adjusting threaded spindle 34 rotatably mounted in a cover plate 35 of the housing 10 co-operates with said threaded hole. A hand wheel 36 is rigidly mounted on the spindle 34. A collar 37 of said spindle and the hub 38 of the hand wheel 36 (Figs. 1 and 3) prevent any axial movement of the adjusting spindle 34. The lid 35 is connected to the housing by means of bolts 40.

As it may be seen from the drawings a rotation of the hand wheel 36 will result in the frame 28 and thereby also the discs 23 and 24 being displaced in upward and downward direction.

As represented in Figs. 1, 4 and 5 the sleeves 14 and 22 as well as the brackets 30 have suitable cut-outs 39, 40' and respectively 41, 40' in their parts facing one another. These cut-outs are shaped so that the projecting portions 42 of the brackets 30 may enter into the cut-outs 39, 41 of the sleeves 14, 22, when the discs 23, 24 are displaced in upward and downward direction bodily with their frame 28. Owing to the provision of such cut-outs the height dimension of the entire mechanism may be reduced, inasmuch as the diameter of the discs 23, 24 may be made smaller by the depth of said cut-outs.

An upward and downward movement of the frame 28 and the discs 23 and 24 will cause the ball 1 to be shifted along the generatrices $n-n$, $n_1-n_1$ of the dished operating frusto-conical surfaces 5 of the friction wheels 2 and 3 (Figs. 1 and 1a). Thereby the ratio of the movement transmitted from friction wheel 2 onto friction wheel 3 may be continually altered, inasmuch as the ball 1 is caused to co-operate with parts of the frusto-conical surfaces 5, 5 having different radii. So, for instance, if the frame 28 is displaced in upward direction (in Figs. 1 and 3), the ball 1 will slide towards the apex of the frusto-conical surface of the wheel 2 and away from the apex or towards the base of the frusto-conical surface of the wheel 3. Thereby the ball is brought into contact with a circle $y_1$ on the frusto-conical surface 5 of wheel 2 which is smaller than the circle $y$ on the frusto-conical surface 5 of wheel 3. Such operating circles $y_1$ and $y$ are viewed as straight dash-and-dotted lines in the diagrammatic representation of Fig. 1a. In said figure, it is true, both circles $y_1$ and $y$ are of the same magnitude that will correspond to a transmission ratio 1:1. However it is easy to imagine that if the ball 1 of Fig. 1a is shifted along the generatrices $n-n$ and $n_1-n_1$ in the direction of the arrow $a$ of said figure the transmission ratio from the driving wheel 2 onto the driven wheel 3 will be smaller than 1:1. This is due to the ball 1 being in contact with an operating circle $y_1$ on the surface 5 of wheel 2 which is smaller than the operating circle $y$ on the surface 5 of wheel 3. If the ball is displaced in the direction of the arrow $b$ in Fig. 1a, what may be caused by a sinking movement of the frame 28, it may be easy to perceive by analogous considerations that the transmission ratio from the wheel 2 onto the wheel 3 will be greater than 1:1.

The distance between the friction members 2 and 3 in axial direction is chosen so that already in the neutral position of the transmission mechanism, i. e., when its ratio is 1:1, a certain pressure, though a slight one, is experienced by the ball 1. This pressure is sufficient to have between both friction members wheels 2 and 3 and their intermediate friction member (ball 1) a friction necessary to a positive transmission of the torque from the driving shaft onto the driven one.

As may be seen from Fig. 1, the represented section line II—II has its middle portion passing through the points of contact of the ball 1 with the operating generatrices $n-n$ and $n_1-n_1$ of Fig. 1a. Hence a sectional plane $z-z$ (Fig. 1a) comprising said section line II—II will intersect the operating frusto-conical surfaces 5, 5 of the wheels 2 and 3 along the arcuate lines $z5$, $z5$ represented in Fig. 2. From this latter representation it may be seen that if the ball 1 has any lag with respect to the frusto-conical surface of a driving wheel such as 2 and on the other hand if the frusto-conical surface of a driven wheel such as 3 has any lag with respect to said ball, said latter is urged (following to the given rotational direction of the shafts 82, 83) into either one of the converging parts of the space defined by the section lines $z5$, $z5$ of Fig. 2.

By this means an automatic wedging action of the ball between the friction member occurs, whereby a compressive force between the ball and both the driving and driven wheels is created, necessary to the transmission of the torque. The rate of such wedging action and compressive force corresponds to the magnitude of the transmitted torque. Under the wedging action there will also arise a component force tending to shift the ball 1 along the generatrices $n-n$, $n_1-n_1$ of the operating surfaces 5 of the friction members (Fig. 1a) in upward or downward direction according as to which of the friction members 2 or 3 is just the driving one. Such component force is being taken up by the discs 23, 24 (Fig. 1). Owing to said discs being mounted rotatably there will be no sliding friction between the ball 1 and the said discs 23, 24.

In the exemplary embodiment of this invention represented on Figs. 1, 1a, 2 and 3 and hereunto described both friction members 2 and 3 have identical dimensions and their geometrical axes are parallel. However the invention is not limited only to such embodiment, but on the contrary it also comprises variable speed friction gear power transmission mechanisms having their principle of operation and general structure identical with that of the hereunto described mechanism but wherein their friction members or wheels have operating frusto-conical surfaces of different diameters and/or the rotational axes of such friction members form a certain angle between them as represented in the diagrams of Figs. 6 and 7. The only condition to be preserved in such alternative structures resides in a parallelism between both generatrices of the frictional wheels simultaneously operating with the intermediate friction member of ball. So in the case of Fig. 6 the operating surfaces 5', 5' have different diameters but the shafts 82', 83' of the friction wheels 2', 3' are parallel to one another. The parallelism of the generatrices co-operating with the ball 1' is warranted by the equality of the taper angles of the frusto-conical surfaces 5', 5'.

In the case of Fig. 7 both shafts of the transmission, viz. the driving shaft 82" and the driven shaft 83" are positioned at an angle to one another. In this event the parallelism of both generatrices co-operating with the ball 1" is preserved by a suitable choice of different taper angles $\alpha$ and $\beta$ of both frusto-conical dished surfaces of the friction wheels 3" and 2" as indicated in Fig. 7.

The embodiments represented on Figs. 6 and 7 may have their different structural details formed and operating in the manner hereunto disclosed in connection with the embodiment of Figs. 1 to 5 so that it is not deemed necessary to have such details described and illustrated once more.

From the disclosures of this specification and drawings it may be seen that this invention provides a variable speed friction gear power transmission mechanism which is capable of transmitting a torque from one shaft onto another one with any desired ratio that may be chosen at will and continually changed within reasonable limits by merely displacing an intermediate friction member or ball between a pair of dished frusto-conical surfaces provided on a driving and a driven member respectively. The necessary compression force between the ball and both the driving and driven wheels is created by an automatic wedging action therebetween. This transmission mechanism has a simple and compact construction and it is easy and reliable in use, affording at the same time a high working efficiency.

Owing to any sliding friction between the working parts of this mechanism being eliminated, it is not liable to lead to excessive heat development at certain points between the working parts as it has been the case in a number of heretofore known friction drive power transmission devices.

What I claim is:

1. A variable speed friction gear power transmission device comprising a driving member and a driven member having each a dish-shaped frusto-conical surface, a ball shaped intermediate friction member inserted between said driving member and said driven member and being in contact with both of said dish-shaped surfaces, stationary housing means in which said driving member and said driven member are rotatably mounted, and rotatable means bodily displaceable in relation to said housing means and being in rolling engagement with said ball shaped intermediate friction member, said rotatable means being adapted to displace said ball shaped member along a pair of parallel generatrices of the said frusto-conical surfaces of said driving member and said driven member, so that the ratio of the movement transmitted by said friction gear device may be continually altered and adjusted at will between two limit values, the compressive force necessary to the transmission of a torque from said driving member onto said driven member being produced by an automatic wedging action varying in response to the magnitude of the transmitted torque.

2. A variable speed friction gear power transmission device, comprising a pair of friction wheels rigidly connected respectively to a driving shaft and to a driven shaft, each of said friction wheels having a dished frusto-conical operating surface, an intermediate friction member formed as a ball inserted between and being in contact with the said dished frusto-conical surfaces of both said friction wheels, a stationary housing in which said friction wheels and their shafts are rotatably mounted, a frame having rotatably mounted therein a pair of discs being in rolling engagement with said ball, and adjusting means adapted to move said frame bodily with said discs in relation to said housing, whereby said ball is displaced between and along a pair of parallel generatrices of both said frusto-conical surfaces, so as to be brought into operative engagement with parts of said surfaces having radii of any desired proportion to one another, whereby the transmission ratio of said friction gear device may be continually altered and adjusted at will between two limit values, the compressive force necessary to the transmission of a torque from said driving shaft onto said driven shaft being produced by an automatic wedging of said ball between said dished frusto-conical surfaces in response to the transmitted torque.

3. A variable speed friction gear power transmission device, comprising a pair of friction wheels rigidly connected respectively to a driving shaft and to a driven shaft, said shafts having their rotational axes parallel to one another and both of said friction wheels having identical dished frusto-conical operating surfaces, an intermediate friction member formed as a ball inserted between and being in contact with the said dished frusto-conical surfaces of both said friction wheels, a stationary housing in which said friction wheels and their shafts are rotatably mounted, a frame having rotatably mounted therein a pair of discs being in rolling engagement with said ball, and adjusting means adapted to move said frame bodily with said discs in relation to said housing, whereby said ball is displaced between and along a pair of parallel generatrices of both said frusto-conical surfaces, so as to be brought into operative engagement with parts of said surfaces having radii of any desired proportion to one another, whereby the transmission ratio of said friction gear device may be continually altered and adjusted at will between two limit values, the compressive force necessary to the transmission of a torque from said driving shaft onto said driven shaft being produced by an automatic wedging of said ball between said dished frusto-conical surfaces in response to the transmitted torque.

4. A variable speed friction gear power transmission device, comprising a pair of friction wheels rigidly connected respectively to a driving shaft and to a driven shaft, said shafts having their rotational axes parallel to one another and said friction wheels having operating dished frusto-conical surfaces of different diameters, an intermediate friction member formed as a ball inserted between and being in contact with the said dished frusto-conical surfaces of both said friction wheels, a stationary housing in which said friction wheels and their shafts are rotatably mounted, a frame having rotatably mounted therein a pair of discs being in rolling engagement with said ball, and adjusting means adapted to move said frame bodily with said discs in relation to said housing, whereby said ball is displaced between and along a pair of parallel generatrices of both said frusto-conical surfaces, so as to be brought into operative engagement with parts of said surfaces having radii of any desired proportion to one another, whereby the transmission ratio of said friction gear device may be continually altered and adjusted at will between two limit values, the compressive force necessary to the transmission of a torque from said driving shaft onto said driven shaft being produced by an automatic wedging of said ball between said dished frusto-conical surfaces in response to the transmitted torque.

5. A variable speed friction gear power transmission device, comprising a pair of friction wheels rigidly connected respectively to a driving shaft and to a driven shaft, said shafts having their rotational axes positioned at an angle to one another and said friction wheels having dished frusto-conical operating surfaces formed with different taper angles chosen so as to have on both said operating surfaces a pair of mutually parallel generatrices, an intermediate friction member formed as a ball inserted between and being in contact with said pair of parallel generatrices of both said friction wheels, a stationary housing in which said friction wheels and their shafts are rotatably mounted, a frame having rotatably mounted therein a pair of discs being in rolling engagement with said ball, and adjusting means adapted to move said frame bodily with said discs in relation to said housing, whereby said ball is displaced between and along a pair of parallel generatrices of both said frusto-conical surfaces, so as to be brought into operative engagement with parts of said surfaces having radii of any desired proportion to one another, whereby the transmission ratio of said friction gear device may be continually altered and adjusted at will between two limit values, the compressive force necessary to the transmission of a torque from said driving shaft onto said driven shaft being produced by an automatic wedging of said ball between said dished frusto-conical surfaces in response to the transmitted torque.

6. In a device of the kind described, comprising a pair of friction wheels, viz. a driving wheel and a driven wheel having each a dish-shaped frusto-conical surface, a ball-shaped intermediate friction member inserted between and being in contact with both said frusto-conical surfaces, and a stationary housing in which said friction wheels are mounted, the provision of a frame having mounted therein and between said friction wheels a pair of discs being in rolling engagement with said ball shaped intermediate friction member and adapted to rotate in a plane transverse to the rotational axes of said friction wheels, said frame being adapted to move bodily with said discs in a direction transverse to the axes of said friction wheels, whereby said ball shaped member may be displaced along a pair of parallel generatrices of the said frusto-conical surfaces, so that the transmission ratio of said device may be continually altered and adjusted at will between two limit values.

FRIEDRICH CAVALLO.